US012563545B2

(12) United States Patent
Furuskär et al.

(10) Patent No.: US 12,563,545 B2
(45) Date of Patent: Feb. 24, 2026

(54) SUPPRESSING INTERFERENCE ON A WIRELESS COMMUNICATION DEVICE THROUGH BEAMFORMING

(71) Applicant: Telefonaktiebolaget LM Ericsson (publ), Stockholm (SE)

(72) Inventors: Anders Furuskär, Stockholm (SE); Birgitta Olin, Bromma (SE); Niklas Jaldén, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 417 days.

(21) Appl. No.: 18/010,838

(22) PCT Filed: Jun. 23, 2020

(86) PCT No.: PCT/SE2020/050647
§ 371 (c)(1),
(2) Date: Dec. 16, 2022

(87) PCT Pub. No.: WO2021/262050
PCT Pub. Date: Dec. 30, 2021

(65) Prior Publication Data
US 2023/0337218 A1      Oct. 19, 2023

(51) Int. Cl.
*H04W 72/1263*      (2023.01)
*H04B 7/06*      (2006.01)
*H04W 72/566*      (2023.01)

(52) U.S. Cl.
CPC ...... *H04W 72/1263* (2013.01); *H04B 7/0617* (2013.01); *H04W 72/566* (2023.01)

(58) Field of Classification Search
CPC ............. H04W 72/27; H04W 72/1263; H04W 72/566; H04W 72/51; H04W 72/046;
(Continued)

(56) References Cited

U.S. PATENT DOCUMENTS

2017/0223744 A1*   8/2017   Qian ................. H04W 74/0833
2019/0239253 A1*   8/2019   Tomeba .............. H04W 74/006
(Continued)

FOREIGN PATENT DOCUMENTS

CN          103139913 B          9/2015
CN          109150272 A     *   1/2019   ........... H04B 7/0617
(Continued)

OTHER PUBLICATIONS

Alcatel-Lucent, "R1-093343: Comparison of CSI Feedback Schemes," 3GPP TSG-RAN WG1 #58, Aug. 24-28, 2009, Shenzhen, China, 11 pages.

(Continued)

*Primary Examiner* — Phong La
(74) *Attorney, Agent, or Firm* — Withrow & Terranova, PLLC

(57)          ABSTRACT

The present disclosure relates to a method of a radio base station of scheduling a wireless communication device, and a radio base station performing the method. The disclosure further relates to a method of a radio base station of suppressing interference of signals to which a wireless communication device of a neighbouring radio cell is subjected, and a radio base station performing the method.

22 Claims, 4 Drawing Sheets

(58) Field of Classification Search
CPC ... H04L 5/0048; H04L 5/0035; H04B 7/0617;
H04B 7/024
See application file for complete search history.

(56) References Cited

U.S. PATENT DOCUMENTS

| | | | | |
|---|---|---|---|---|
| 2020/0068585 A1 * | 2/2020 | Yoshikawa | ........... | H04W 24/10 |
| 2023/0337218 A1 * | 10/2023 | Furuskär | .............. | H04W 72/27 |

FOREIGN PATENT DOCUMENTS

| | | | | | | |
|---|---|---|---|---|---|---|
| CN | | 105359569 | B | * | 7/2019 | ............. H04B 7/022 |
| CN | | 106559374 | B | * | 12/2019 | ......... H04L 27/2691 |
| WO | WO-2013044804 | A1 | * | 4/2013 | ......... H04W 52/243 |
| WO | WO-2018173646 | A1 | * | 9/2018 | ............. H04B 7/024 |
| WO | | 2018190977 | A1 | 10/2018 | |

OTHER PUBLICATIONS

International Search Report and Written Opinion for International
Patent Application No. PCT/SE2020/050647, mailed Jan. 28, 2021,
13 pages.

* cited by examiner

SUPPRESSING INTERFERENCE ON A WIRELESS COMMUNICATION DEVICE THROUGH BEAMFORMING

This application is a 35 U.S.C. § 371 national phase filing of International Application No. PCT/SE2020/050647, filed Jun. 23, 2020, the disclosure of which is incorporated herein by reference in its entirety.

TECHNICAL FIELD

The present disclosure relates to a method of a radio base station of scheduling a wireless communication device, and a radio base station performing the method. The disclosure further relates to a method of a radio base station of suppressing interference of signals to which a wireless communication device of a neighbouring radio cell is subjected, and a radio base station performing the method.

BACKGROUND

When scheduling a wireless communication device such as a smart phone for a service involving transmission and/or reception of data in a tele- or data communication system, it is crucial that the quality of the service is adequate. In other words, when allocating resources to the smart phone for transmitting and receiving data, sufficient resources must be allocated in order for the service quality to be sufficiently high.

Quality of Service (QoS) is related to quality perceived by users of a service. The service may be embodied in the form of e.g. telephony, web browsing, video, etc. The QoS is typically quantified and measured using different metrics such as delay, data rate and packet loss.

For a smart phone, the QoS is oftentimes negatively affected by interference of signals to which the smart phone is subjected from neighbouring radio cells. It is thus desirable to suppress interference caused by such signals.

SUMMARY

An object is to solve, or at least mitigate, this problem in the art and to provide an improved method of a radio base station of scheduling a wireless communication device.

This object is attained in a first aspect of the invention by a method of a radio base station of scheduling a wireless communication device served by the radio base station. The method comprises determining a priority class of the wireless communication device, sending an instruction to the wireless communication device to transmit data from which a communication channel of the wireless communication device can be detected, providing a neighbouring base station with an indication of the priority class of the wireless communication device, the neighbouring base station performing beamforming for suppressing interference of signals to which the wireless communication device transmitting said data is subjected for said communication channel, wherein degree of suppression of signal interference being performed by the neighbouring base station is based on the priority class of the wireless communication device, and scheduling resources for communication of the wireless communication device, wherein amount of resources being scheduled is based on the priority class of the wireless communication device.

This object is attained in a second aspect of the invention by a method of a radio base station of suppressing interference of signals to which a wireless communication device of a neighbouring radio cell is subjected. The method comprises receiving data from which a communication channel over which the data is sent can be detected, receiving an indication of a priority class of the wireless communication device communicating over the communication channel detected from said received data, and performing beamforming to suppress interference of the signals to which the wireless communication device is subjected for said communication channel based on the priority class.

This object is attained in a third aspect of the invention by a radio base station configured to schedule a wireless communication device served by the radio base station. The radio base station comprises a processing unit and a memory, said memory containing instructions executable by said processing unit, whereby the radio base station is operative to determine a priority class of the wireless communication device, send an instruction to the wireless communication device to transmit data from which quality of a communication channel of the wireless communication device can be estimated, provide a neighbouring base station with an indication of the priority class of the wireless communication device, the neighbouring base station performing beamforming for suppressing interference of signals to which the wireless communication device transmitting said data is subjected for said communication channel, wherein degree of suppression of signal interference being performed by the neighbouring base station is based on the priority class of the wireless communication device; and to schedule resources for communication of the wireless communication device, wherein amount of resources being scheduled is based on the priority class of the wireless communication device.

This object is attained in a fourth aspect of the invention by a radio base station configured to suppress interference of signals to which a wireless communication device of a neighbouring radio cell is subjected. The radio base station comprises a processing unit and a memory, said memory containing instructions executable by said processing unit, whereby the radio base station is operative to receive data from which a communication channel over which the data is sent can be detected, receive an indication of a priority class of the wireless communication device communicating over the communication channel detected from said received data, and to perform beamforming to suppress interference of the signals to which the wireless communication device is subjected for said communication channel based on the priority class.

A radio base station (RBS) determines that when scheduling communication for a number of wireless communication devices, referred to in the following as User Equipment (UE), served by the RBS—i.e. when allocating resources to the UEs for transmitting and/or receiving data-a priority class associated with the respective UE will be taken into account. In this particular example, the UEs belong either to a "gold", "silver" or "bronze" priority class, where gold class members are given the highest priority and bronze class members the lowest priority.

Now, upon determining for instance that the priority class of a first of the UEs is a gold member, the RBS sends an instruction to the first UE to broadcast data from which a communication channel of the first UE may be detected, e.g. in the form of a so-called sounding reference signal (SRS). In a first alternative, the first UE further includes an indication of the priority class with the SRS.

A neighbouring RBS may thus identify a channel over which the first UE communicates as well as the priority class.

In a second alternative, the serving RBS sends an instruction to the neighbouring RBS that the UE currently broadcasting the SRS from which the communication channel is identified (i.e. the first UE) is to be prioritized according to its priority class with respect to interference suppression for the communication channel discovered from the broadcasted SRS. In the second alternative, the serving RBS sends the indication of the priority class. The neighbouring RBS determines based on the priority class to which degree the interference should be suppressed.

In response thereto, the neighbouring RBS will perform beamforming such that signals being transmitted by the neighbouring RBS at the same frequency as that utilized by identified channel deployed by the first UE will be suppressed in order to decrease any interference that the first UE may be subjected to by the neighbouring RBS.

This is advantageous, since a communication channel utilizing said same frequency still can be deployed for communication in a cell served by the neighbouring RBS while at the same time not causing interference (or at least to a far lower degree) to the first UE. Further advantageous is that the beamforming is selectively performed based on the priority class of the first UE.

Finally, the serving RBS schedules the first UE. In an embodiment, the scheduling is performed according to the priority class associated with the first UE. For instance, the scheduling is performed such that a high Quality of Service (QoS) is delivered to the first UE being associated with the highest priority class. Thereafter, data will be transmitted/received by the first UE according to the scheduling.

In an embodiment, intracell interference is advantageously suppressed by the serving RBS performing beamforming based on the determined priority class, wherein a UE having a higher priority class is subjected to beamforming which suppresses intracell interference caused by another UE having a lower priority class in the same radio cell.

In an embodiment the neighbouring RBS considers the priority class of one or more UEs which it serves when performing the beamforming to suppress the interference which the first UE is subjected to. For instance, if a UE which is served is a bronze member, the neighbouring RBS perform the beamforming such that the UE being served is subjected to a weaker beam as compared to if it had been a gold member, where the beamforming would be performed such that the served UE is subjected to a stronger beam.

In an embodiment, the instruction of the serving RBS indicates that the communication channel for which suppression of interference is to be performed is the communication channel indicated with said data being transmitted at a particular point in time.

In a further aspect, a computer program is provided comprising computer-executable instructions for causing a radio base station to perform steps recited in the method according to the first aspect when the computer-executable instructions are executed on a processing unit included in the radio base station.

In still a further aspect, a computer program product comprising a computer readable medium is provided, the computer readable medium having the computer program according to the above-mentioned further aspect embodied thereon.

In yet a further aspect, a computer program is provided comprising computer-executable instructions for causing a radio base station to perform steps recited in the method according to the second aspect when the computer-executable instructions are executed on a processing unit included in the radio base station.

In still an aspect, a computer program product is provided comprising a computer readable medium, the computer readable medium having the computer program according to the above-mentioned yet further aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
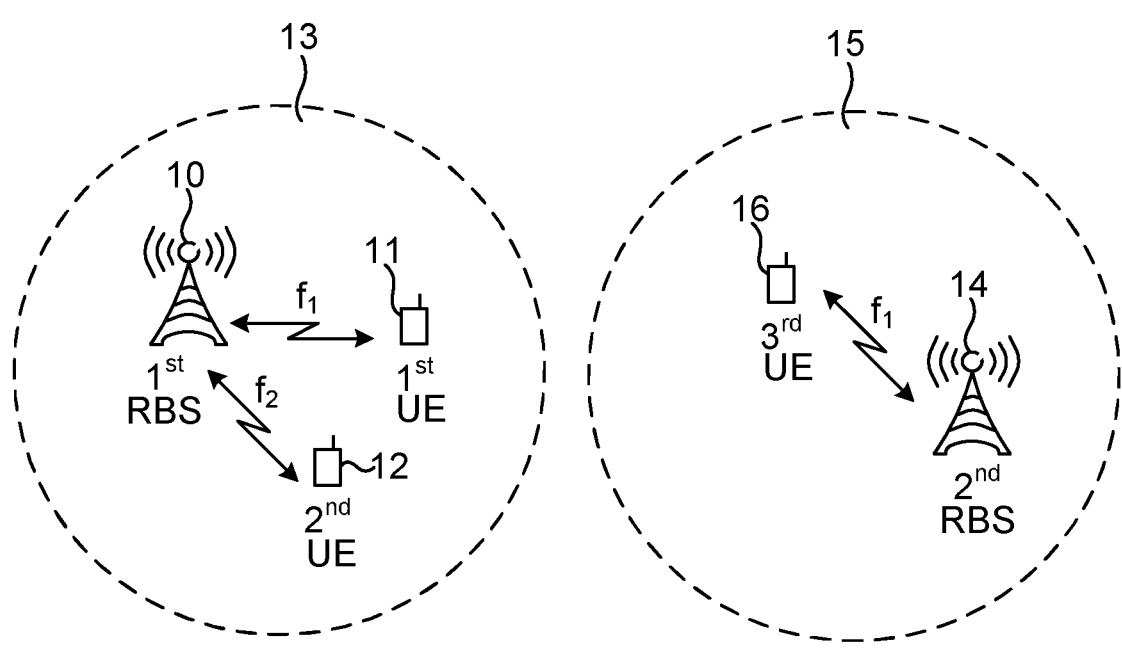
FIG. 1 schematically illustrates a radio communication system.

FIG. 1 schematically illustrates a radio communication system where a first radio base station (RBS) 10 serves a first wireless communication device 11 and a second communication device 12. Commonly, the communication devices being for instance smart phones, tablets or smart watches are referred to as User Equipment (UE).

Thus, the first RBS 10 forms a first cell 13 serving the first UE 11 and the second UE 12. Now, as the first and second UE 11, 12 moves away from the first RBS 10 and towards a second RBS 14 forming a second cell 15 serving a third UE 16, the two UEs 11, 12 may be subjected to interference.

In other words, assuming that the first UE 11 communicates with the first RBS 10 over a frequency f1, a signal transmitted at the same frequency f1 from the second RBS 14 and the third UE 16 will cause (undesired) interference to the communication occurring at frequency f1 between the first RBS 10 and the first UE 10. This is commonly referred to as intercell interference.

Suppression of the interference occurring at frequency f1 in the first cell 13 could be attained by avoiding transmission of signals at frequency f1 in the second cell 15. However, such an approach reduces the number of possible communication channels to deploy. Further, even if such approach would be used for suppression of interference, it cannot be practically performed for all UEs experiencing interference.

Figure 2:
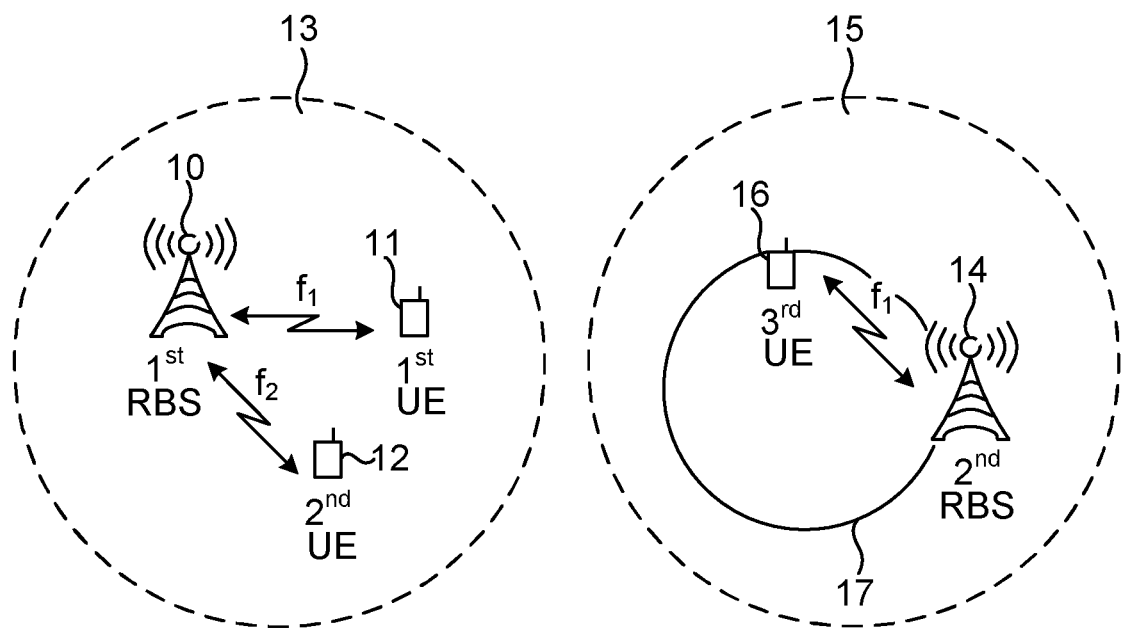
FIG. 2 schematically illustrates a radio communication system in which an improved method of scheduling UEs according to an embodiment may be implemented.

FIG. 2 schematically illustrates a radio communication system in which an improved method of scheduling UEs according to an embodiment may be implemented. Again, the first RBS 10 serves the first UE 11 and the second UE 12 in the first cell 13, while the second RBS 14 serves the third UE 16 in the second cell 15. Further, for illustrative purposes, a lobe 17 produced by the second RBS 14 transmitting signals via numerous antennas is shown.

Figures 3A, 3B:
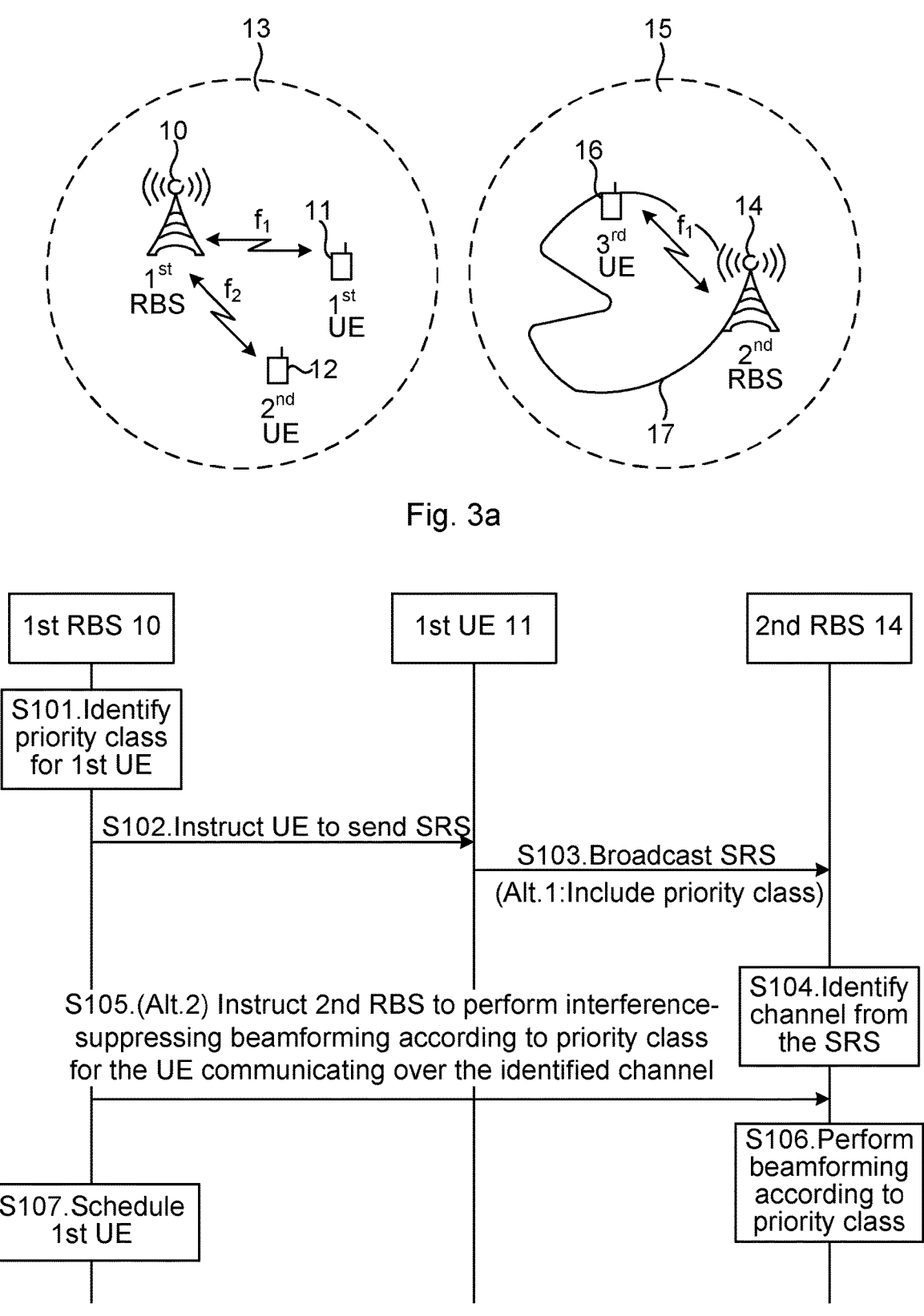
FIG. 3a schematically illustrates a radio communication system in which the improved method of scheduling UEs according to an embodiment is performed.
FIG. 3b shows a flowchart illustrating the method of scheduling a UE according to an embodiment.

FIG. 3a schematically illustrates a radio communication system in which the improved method of scheduling UEs according to an embodiment is performed. Reference will further be made to FIG. 3b showing a flowchart illustrating the method according to an embodiment.

In a first step S101, the first RBS 10 determines that when scheduling communication for the UEs 11, 12 served by the first RBS 10, i.e. when allocating resources to the UEs 11, 12 for transmitting and/or receiving data, a priority class associated with the respective UE will be taken into account. In this particular example, the UEs belong either to a "gold", "silver" or "bronze" priority class, where gold class members are given the highest priority and bronze class members the lowest priority.

Typically, the priority is quantified in terms of Quality of Service (QoS). That is, a gold class member is given a higher QoS than a silver member or bronze member. The service being provided may be telephony, web browsing, video, etc. Common QoS metrics are delay, data rate, level of packet loss, etc. As an example, a gold class member wishing to download video content is allocated a high QoS in the form of a high data download rate. Hence, the gold member may during scheduling be allocated resources allowing the member to download data at (at least) a high predetermined data rate.

Now, upon determining in step S101 for instance that the priority class of the first UE 11 is a gold class, the first RBS 10 sends an instruction in step S102 to the first UE 11 to transmit data from which a communication channel of the first UE 11 may be detected, i.e. the communication channel illustrated to be established over frequency f1.

In for instance Long Term Evolution (LTE) standard, this data is embodied by a so-called sounding reference signal (SRS). The SRS is a reference signal broadcasted by the first UE 11 such that an RBS—in this case the second RBS 14—is able to identify a channel over which the first UE 11 communicates and to estimate the quality of the channel. The information provided by the channel quality estimate is typically used to schedule uplink transmissions on resource blocks of good quality. It may be envisaged that for a lower-priority UE, for instance belonging to a bronze class, no instruction will be sent to broadcast the SRS for the purpose of suppressing interference for such bonze-class UE, even though it also may be envisaged that a lower-priority UE is instructed to transmit the SRS. In the following, the data being transmitted from which the communication channel of the first UE 11 may be detected is exemplified to by an SRS, even though it may be envisaged that other signals may be utilized, such as a dedicated signal for this purpose.

In response to the received instruction, the first UE 11 broadcasts the SRS in step S103 such that the communication channel of the first UE 11 may be discovered by the neighbouring second RBS 14 detecting the broadcasted SRS in step S104.

Further, the first RBS 10 provides the second RBS 14 with the priority class of the first UE 11.

Two alternative embodiments for providing the priority class of the first UE 11 is illustrated in FIG. 3a. In a first alternative, the priority class is transmitted by the first UE 11 in step S103 with the SRS (or any other appropriate signal being used for the purpose) upon receiving the instruction from the first RBS 10 in step S102.

In a second alternative, the first RBS 10 sends an instruction in step S105 to the second RBS 14 that the UE currently broadcasting the SRS from which the communication channel is identified in step S104—i.e. the first UE 11—is to be prioritized according to its priority class (which is included in the transmission of step S105) with respect to interference suppression for the communication channel discovered from the broadcasted SRS. It may be envisaged that the second RBS 14 determines based on the priority class (included in the instruction of step S105 or alternatively the SRS of step S103) to which degree the interference should be suppressed.

Thus, in a scenario where the first UE 11 sends the priority class with the SRS in step S103, there is no need for the first RBS 10 perform the transmission of step S105.

However, it may be envisaged that the first UE 11 itself does not have access to the priority class, for instance in a scenario where a core network node communicates the priority class to the first RBS 10 (but where no further communication is made to the first UE 11). If so, the first RBS 10 performs the communication in step S105.

In response to receiving the instruction comprising the priority class in step S105 (or alternatively after having received the priority class in step S103) and identifying the communication channel utilized by first UE 11 from the broadcasted SRS, the second RBS 14 will in step S106—in order to suppress the interference to which the first UE 11 is subjected to—perform beamforming as illustrated in FIG. 3a.

The second RBS 14 may also in an embodiment consider the priority class of the third UE 16 when performing the beamforming to suppress the interference which the first UE 11 is subjected to. For instance, if the third UE 16 is a bronze member, the second RBS 14 may perform the beamforming such that the third UE 16 is subjected to a weaker beam as compared to if the third UE 16 had been a gold member, where the beamforming would be performed such that the third UE 16 is subjected to a stronger beam.

In line with the previous discussion, in case the first UE 11 communicates at frequency f1 with the first RBS 11 and the third UE 16 communicates at the same frequency f1 with the second RBS 14, the beamforming performed by the second RBS 14 will greatly suppress the interference to which the first UE 11 is subjected by signals being transmitted between the second RBS 14 and the third UE 16 at frequency f1.

In other words, while the lobe 17 produced by the antennas of the second RBS 14 is formed such that the first UE 11 is subjected to signals transmitted by the second RBS 14 to no or little degree, the third UE 16 is still within the less attenuated part of the lobe 17 produced by the beamforming, as illustrated in FIG. 3*a*.

This is advantageous, since the communication channel utilizing frequency f1 still can be deployed for communication in the cell served by the second RBS 14 while at the same time not causing interference (or at least to a far lower degree) to the first UE 11, which also communicates over a communication channel utilizing frequency f1.

Further advantageous is that the beamforming is selectively performed based on the priority class of the first UE 11.

Finally, the first RBS 10 schedules the first UE 11 in step S107. The scheduling may be performed in accordance with the priority class associated with the first UE 11, even though it is not strictly required. For instance, the scheduling is performed such that a high QoS is delivered to the first UE 11 being associated with the highest priority class.

Thereafter, data will be transmitted/received by the first UE 11 according to the scheduling. For instance, it may be envisaged that the first UE 11 (being a gold member) will be given a higher bandwidth than the second UE 12 (being a bronze member), that the channel to the first UE 11 is set up by allocating resources such that the first UE 11 will experience a lower data packet loss than the second UE 12, or that the first UE 11 is placed first in a data transmission/reception queue.

Hence, the first RBS 11 schedules the first UE 11, possibly according to the priority class, and further advantageously causes the first UE 11 to be subjected to a lower degree of interference from the second RBS 14, which generally results in a higher QoS.

In an embodiment, the priority class indicates to which degree the signal interference should be suppressed by the neighbouring second RBS 14. For instance, it may be envisaged that for a gold member, the interference should more or less be "nulled", for a silver member the interference is to be reduced by 50%, while for a bronze member no suppression is undertaken.

As can be concluded, the scheduling of resources for communication of the first UE 11 may advantageously be based on the priority class, wherein the amount of resources being scheduled and the degree of suppression of signal interference being performed is such that more resources may be scheduled for a higher-priority UE, and the degree of suppression of signal interference caused by the second RBS 14 performing beamforming in step S106 in response to the instruction being received form the first RBS 10 in step S105 is higher for a higher-priority UE.

In an embodiment, the instruction sent by the first RBS 10 to the second RBS 14 in step S105 may further indicate that the communication channel for which interference suppression is to be undertaken by the second RBS 14 performing beamforming is the communication channel indicated in an SRS being transmitted at a particular point in time.

For instance, it may happen that more than one UE indicates with a broadcasted SRS that it intends to communicate over a given channel, such as f1. For instance, the first UE 11 may indicate that it intends to communicate over f1 with an SRS broadcasted at time t1, while the third UE 16 indicates that it intends to communicate over f1 with an SRS transmitted at time t2. Thus, the second RBS 14 may not be able to determine for which one of the two UEs interference-suppression is to be undertaken.

With the instruction sent by the first RBS 10 in step S105, the second RBS 14 is made aware that it is the communication channel associated with the SRS sent by the first UE 11 at time t1 which should be subjected to interference suppression according to the included priority class (by means of the second RBS 14 performing beamforming). Alternatively, the second RBS 14 is made aware of that already in step S103 where the priority class is received from the first UE 11 (in which case no transmission is required by the first RS 10 in step S105).

In a further embodiment, the first RBS 10 will suppress interference of signals to which one or more UEs within its serving cell 11 is subjected from other UEs within the serving cell, i.e. what commonly is referred to as intracell interference.

Figures 4A, 4B:
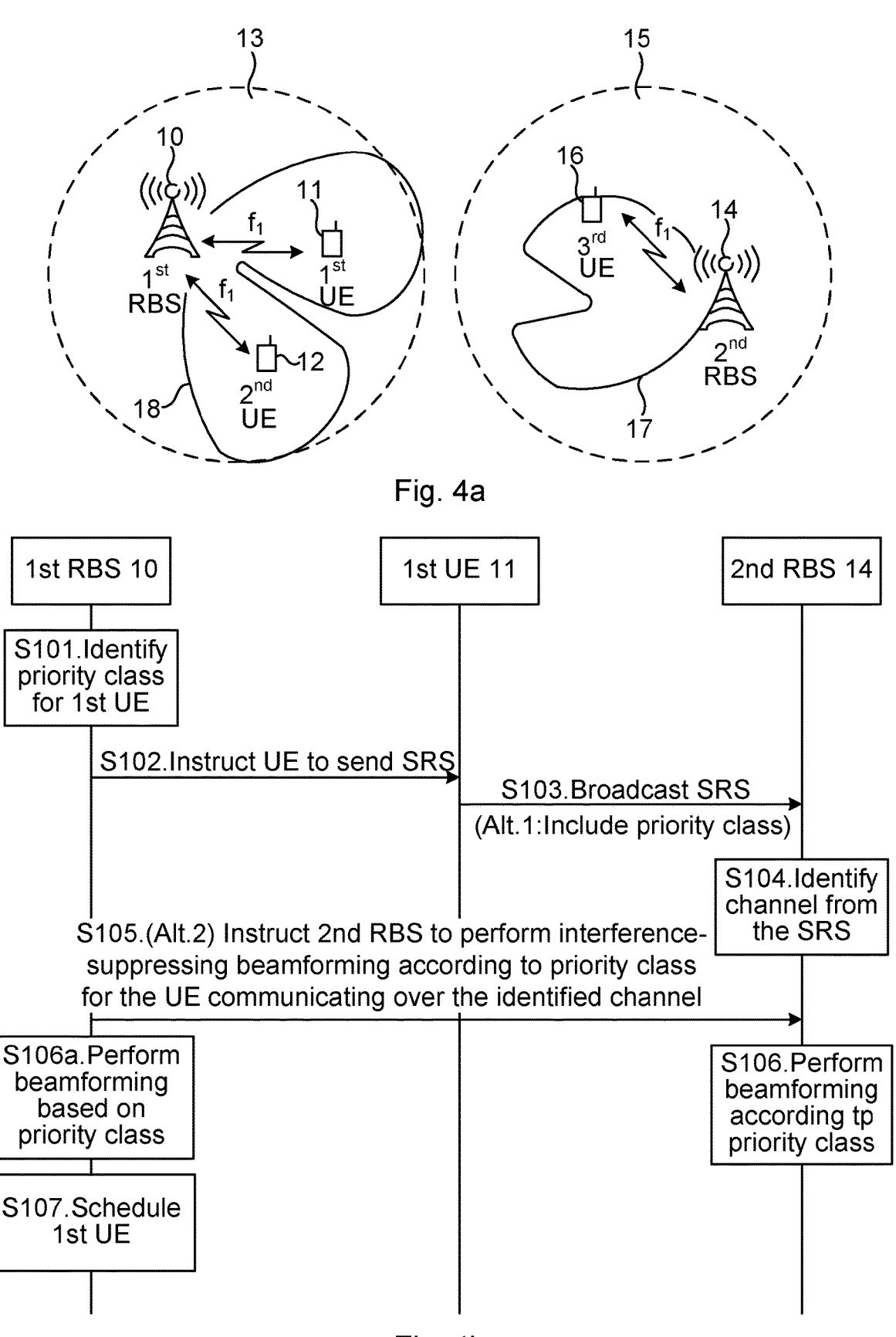
FIG. 4a schematically illustrates a radio communication system in which intracell interference is present.
FIG. 4b shows a flowchart further illustrating intracell suppression according to an embodiment.

FIG. 4*a* illustrates a scenario where it is assumed that MU-MIMO (multi-user, multiple input, multiple output) access is performed within the serving cell 13, in which case the communication channels of first UE 11 and the second UE 12 uses the same frequency f1. This is enabled by the first RBS 10 performing beamforming such that the channel of one of the two UEs is not (greatly) affected by signals sent by the other UE at the same frequency f1, and vice versa, as illustrated with lobe 18 produced by the first RBS 10.

FIG. 4*b* shows a flowchart illustrating a method of scheduling a UE according to this embodiment. As can be seen, the method is identical to that illustrated in FIG. 3*b* up until step S106*a*, where the first RBS 10 performs beamforming based on priority class to advantageously suppress intracell interference. In this example, the first UE 11 is a gold member while the second UE 12 is a bronze member.

Figure 4C:
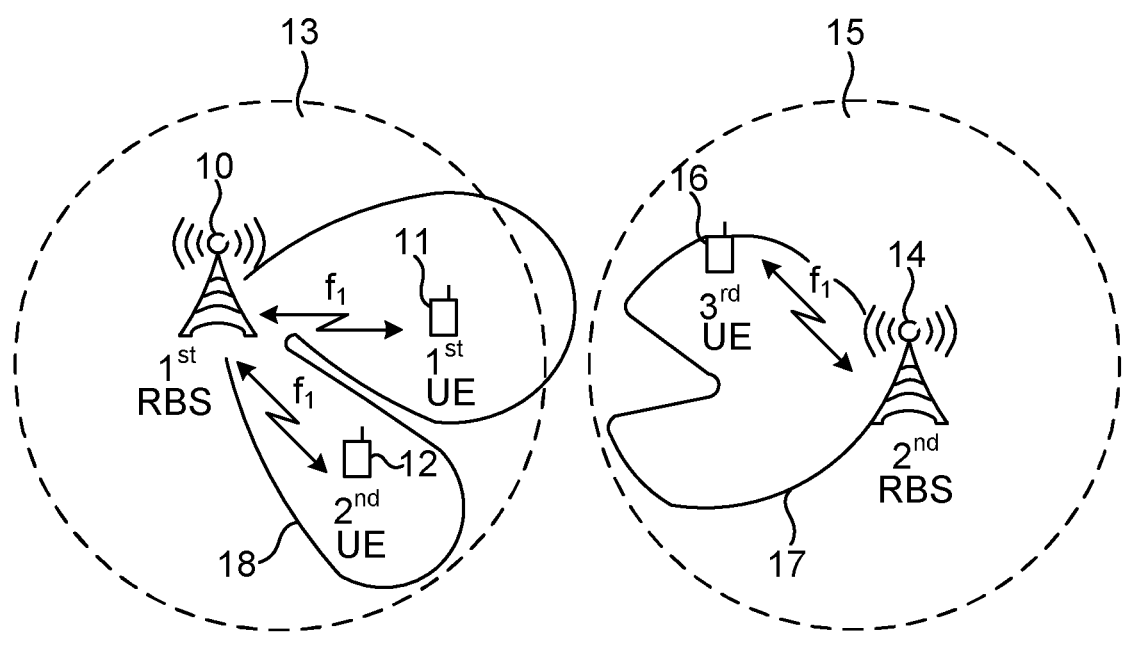
FIG. 4c schematically illustrates a radio communication system in which intracell interference is suppressed according to an embodiment.

As illustrated in FIG. 4*c*, the first RBS 10 will thus perform beamforming such that the lobe 18 is attenuated in a direction towards the first UE 11, while being suppressed in a direction towards the second UE 12.

Thereafter, scheduling is performed is previously described with reference to step S107. That is, the first RBS 10 may schedule the first UE 11 in step S107 according to the priority class associated with the first UE 11. For instance, the scheduling is performed such that a high QoS is delivered to the first UE 11 being associated with the highest priority class.

It may further be envisaged that with the beamforming performed by the first RBS 10, a less amount of resources is required to be assigned for fulfilling any QoS requirements for the first UE 11. These resources may be assigned to the second UE 12 instead being subjected to less favourable beamforming.

Figure 5:
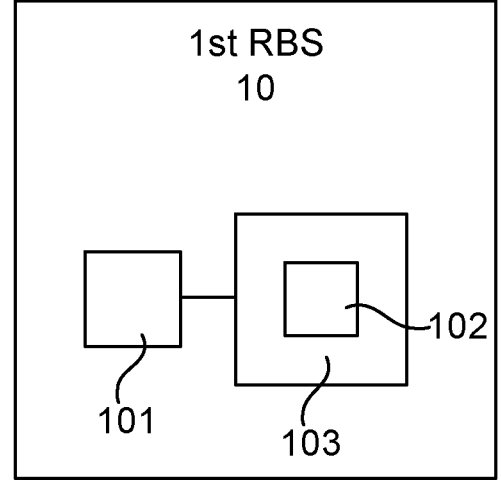
FIG. 5 illustrates a first RBS according to an embodiment.

FIG. 5 illustrates first RBS 10 configured to schedule a UE served by the first RBS 10 according to an embodiment. The steps of the method performed by the first RBS 10 are in practice performed by a processing unit 101 embodied in the form of one or more microprocessors arranged to execute a computer program 102 downloaded to a suitable storage volatile medium 103 associated with the microprocessor, such as a Random Access Memory (RAM), or a non-volatile storage medium such as a Flash memory or a hard disk drive. The processing unit 101 is arranged to cause the first RBS 10 to carry out the method according to embodiments when the appropriate computer program 102 comprising computer-executable instructions is downloaded to the storage medium 103 and executed by the processing unit 101. The storage medium 103 may also be a computer program product comprising the computer program 102. Alternatively, the computer program 102 may be transferred to the storage medium 103 by means of a suitable computer program product, such as a Digital Versatile Disc (DVD) or a memory stick. As a further alternative, the computer program 102 may be downloaded to the storage medium 103 over a network. The processing unit 101 may alternatively be embodied in the form of a digital signal processor (DSP), an application specific integrated circuit (ASIC), a field-programmable gate array (FPGA), a complex programmable logic device (CPLD), etc.

Figure 6:
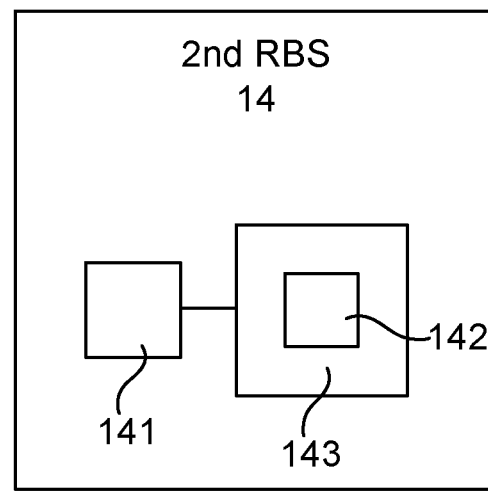
FIG. 6 illustrates a second RBS according to an embodiment.

FIG. 6 illustrates second RBS 14 configured to suppress interference of signals to which a UE of a neighbouring radio cell is subjected according to an embodiment. The steps of the method performed by the second RBS 14 are in practice performed by a processing unit 141 embodied in the form of one or more microprocessors arranged to execute a computer program 142 downloaded to a suitable storage volatile medium 143 associated with the microprocessor, such as a RAM, or a non-volatile storage medium such as a Flash memory or a hard disk drive. The processing unit 141 is arranged to cause the second RBS 14 to carry out the method according to embodiments when the appropriate computer program 142 comprising computer-executable instructions is downloaded to the storage medium 143 and executed by the processing unit 141. The storage medium 143 may also be a computer program product comprising the computer program 142. Alternatively, the computer program 142 may be transferred to the storage medium 143 by means of a suitable computer program product, such as a DVD or a memory stick. As a further alternative, the computer program 142 may be downloaded to the storage medium 143 over a network. The processing unit 141 may alternatively be embodied in the form of a DSP, an ASIC, an FPGA, a CPLD, etc.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a radio base station of scheduling a wireless communication device served by the radio base station, comprising:
   determining a priority class of the wireless communication device;
   sending an instruction to the wireless communication device to transmit data from which a communication channel of the wireless communication device can be detected;
   providing a neighboring base station with an indication of the priority class of the wireless communication device, the neighboring base station performing beamforming for suppressing interference of signals to which the wireless communication device transmitting said data is subjected for said communication channel, wherein degree of suppression of signal interference being performed by the neighboring base station is based on the indication of the priority class of the wireless communication device; and
   scheduling resources for communication of the wireless communication device, wherein amount of resources being scheduled is based on the priority class of the wireless communication device.

2. The method of claim 1, wherein the providing of the neighboring base station with an indication of the priority class of the wireless communication device is performed by configuring the data transmitted by the wireless communication device to further comprise the indication of the priority class of the wireless communication device.

3. The method of claim 1, wherein the providing of the neighboring base station with an indication of the priority class of the wireless communication device further comprises:
   sending, to the neighboring base station, an instruction to perform beamforming for suppressing interference of signals to which the wireless communication device transmitting said data is subjected for said communication channel based on the priority class included with the instruction.

4. The method according to claim 1, further comprising:
   performing beamforming based on the determined priority class, wherein a wireless communication device having a higher priority class is subjected to beamforming which suppresses intracell interference caused by another wireless communication device having a lower priority class in the same radio cell.

5. The method according to claim 1, further comprising:
   indicating that the communication channel for which suppression of interference is to be performed is the communication channel indicated with said data being transmitted at a particular point in time.

6. A method of a radio base station of suppressing interference of signals to which a wireless communication device of a neighboring radio cell is subjected, comprising:
   receiving data from which a communication channel over which the data is sent can be detected;
   receiving an indication of a priority class of the wireless communication device communicating over the communication channel detected from said received data; and
   performing beamforming to suppress interference of the signals to which the wireless communication device is subjected for said communication channel based on the indication of the priority class.

7. The method of claim 6, the indication of the priority class being received from the wireless communication device.

8. The method of claim 6, the indication of the priority class being received from a radio base station serving the wireless communication device.

9. The method of claim 6, wherein the performing of beamforming further comprises:
   determining priority class of one or more wireless communication device served by the radio base station, wherein the determined priority class determines a degree of beamforming to which said one or more wireless communication device served by the radio base station is subjected, where a wireless communication device having a higher priority class is subjected to a stronger beam while a wireless communication device having a lower priority class is subjected to a weaker beam.

10. The method of claim 6, wherein the data from which the communication channel of the wireless communication device is detected is comprised in a sounding reference signal, SRS.

11. The method of claim 8, wherein said radio base station serving the wireless communication device further indicates that the communication channel for which suppression of interference is to be performed is the communication channel indicated with said data being transmitted at a particular point in time.

12. A radio base station configured to schedule a wireless communication device served by the radio base station, the radio base station comprising a processing unit and a memory, said memory containing instructions executable by said processing unit, whereby the radio base station is operative to:

determine a priority class of the wireless communication device;

send an instruction to the wireless communication device to transmit data from which quality of a communication channel of the wireless communication device can be estimated;

provide a neighboring base station with an indication of the priority class of the wireless communication device, the neighboring base station performing beamforming for suppressing interference of signals to which the wireless communication device transmitting said data is subjected for said communication channel, wherein degree of suppression of signal interference being performed by the neighboring base station is based on the priority class of the wireless communication device; and schedule resources for communication of the wireless communication device, wherein amount of resources being scheduled is based on the priority class of the wireless communication device.

13. The radio base station according to claim 12, wherein the providing of the neighboring base station with an indication of the priority class of the wireless communication device is performed by configuring the data transmitted by the wireless communication device to further comprise the indication of the priority class of the wireless communication device.

14. The radio base station according to claim 12, further being operative to, when providing the neighboring base station with an indication of the priority class of the wireless communication device:

send, to the neighboring base station, an instruction to perform beamforming for suppressing interference of signals to which the wireless communication device transmitting said data is subjected for said communication channel based on the priority class included with the instruction.

15. The radio base station according to claim 12, further being operative to:

perform beamforming based on the determined priority class, wherein a wireless communication device having a higher priority class is subjected to beamforming which suppresses intracell interference caused by another wireless communication device having a lower priority class in the same radio cell.

16. The radio base station according to claim 12, further being operative to indicate that the communication channel for which suppression of interference is to be performed is the communication channel indicated with said data being transmitted at a particular point in time.

17. A radio base station configured to suppress interference of signals to which a wireless communication device of a neighboring radio cell is subjected, the radio base station comprising a processing unit and a memory, said memory containing instructions executable by said processing unit, whereby the radio base station is operative to:

receive data from which a communication channel over which the data is sent can be detected;

receive an indication of a priority class of the wireless communication device communicating over the communication channel detected from said received data; and perform beamforming to suppress interference of the signals to which the wireless communication device is subjected for said communication channel based on the indication of the priority class.

18. The radio base station of claim 17, the indication of the priority class being received from the wireless communication device.

19. The radio base station of claim 17, the indication of the priority class being received from a radio base station serving the wireless communication device.

20. The radio base station of claim 17, further being operative to, when performing the beamforming:

determine priority class of one or more wireless communication device served by the radio base station, wherein the determined priority class determines a degree of beamforming to which said one or more wireless communication device served by the radio base station is subjected, where a wireless communication device having a higher priority class is subjected to a stronger beam while a wireless communication device having a lower priority class is subjected to a weaker beam.

21. The radio base station according to claim 17, further being operative to receive the data from which a communication channel of the wireless communication device can be detected in a sounding reference signal, SRS.

22. The radio base station according to claim 19, wherein said radio base station serving the wireless communication device indicates that the communication channel for which suppression of interference is to be performed is the communication channel indicated with said data being transmitted at a particular point in time.

* * * * *